(12) United States Patent
Park et al.

(10) Patent No.: US 9,131,406 B2
(45) Date of Patent: Sep. 8, 2015

(54) METHOD AND APPARATUS FOR REPORTING SHORT STAY IN WIRELESS COMMUNICATION SYSTEM

(71) Applicant: LG ELECTRONICS INC., Seoul (KR)

(72) Inventors: Kyung Min Park, Anyang-si (KR); Jin Sook Ryu, Anyang-si (KR); Jian Xu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/353,717

(22) PCT Filed: Oct. 30, 2012

(86) PCT No.: PCT/KR2012/008982
§ 371 (c)(1),
(2) Date: Apr. 23, 2014

(87) PCT Pub. No.: WO2013/066021
PCT Pub. Date: May 10, 2013

(65) Prior Publication Data
US 2014/0287762 A1    Sep. 25, 2014

Related U.S. Application Data

(60) Provisional application No. 61/553,900, filed on Oct. 31, 2011.

(51) Int. Cl.
*H04W 36/00* (2009.01)
*H04W 24/10* (2009.01)
*H04W 36/32* (2009.01)
*H04W 24/02* (2009.01)

(52) U.S. Cl.
CPC .............. *H04W 24/10* (2013.01); *H04W 24/02* (2013.01); *H04W 36/32* (2013.01)

(58) Field of Classification Search
USPC .................................................. 455/436–448
See application file for complete search history.

(56) References Cited

U.S. PATENT DOCUMENTS

2008/0315110 A1    12/2008    Iwatschenko-Borho et al.

FOREIGN PATENT DOCUMENTS

| WO | 2009-099096 A1 | 8/2009 |
|---|---|---|
| WO | 2010-076998 A2 | 7/2010 |
| WO | 2010-104335 A2 | 9/2010 |

*Primary Examiner* — Joel Ajayi
(74) *Attorney, Agent, or Firm* — Dentons US LLP (57) ABSTRACT

A method and apparatus for avoiding a short stay problem in a wireless communication system is provided. An eNodeB (eNB) may determine a ratio of a number of short stay user equipments (UEs), which stay at a cell shorter than specific threshold time, to total number of UEs staying at the cell, and transmit the ratio of the number of short stay UEs to the total number of UEs to a previous eNB. Or, the eNB may receive measurement information of at least one second cell from a UE, determine whether the UE can be connected to the at least one second cell, and notify a second eNB whether the UE can be connected to the at least one second cell or not.

11 Claims, 12 Drawing Sheets

(b) Among two cells (a) Among three cells

METHOD AND APPARATUS FOR REPORTING SHORT STAY IN WIRELESS COMMUNICATION SYSTEM

This application is a National Stage entry of International Application No. PCT/KR2012/008982, filed on Oct. 30, 2012, which claims priority to U.S. Provisional Application No. 61/553,900 filed Oct. 31, 2011, both of which are incorporated herein in their entirety by reference.

BACKGROUND OF THE INVENTION

1. Field of the Invention

The present invention relates to wireless communication, and more particularly, to a method and apparatus for reporting a short stay of a user equipment in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Figure 1:
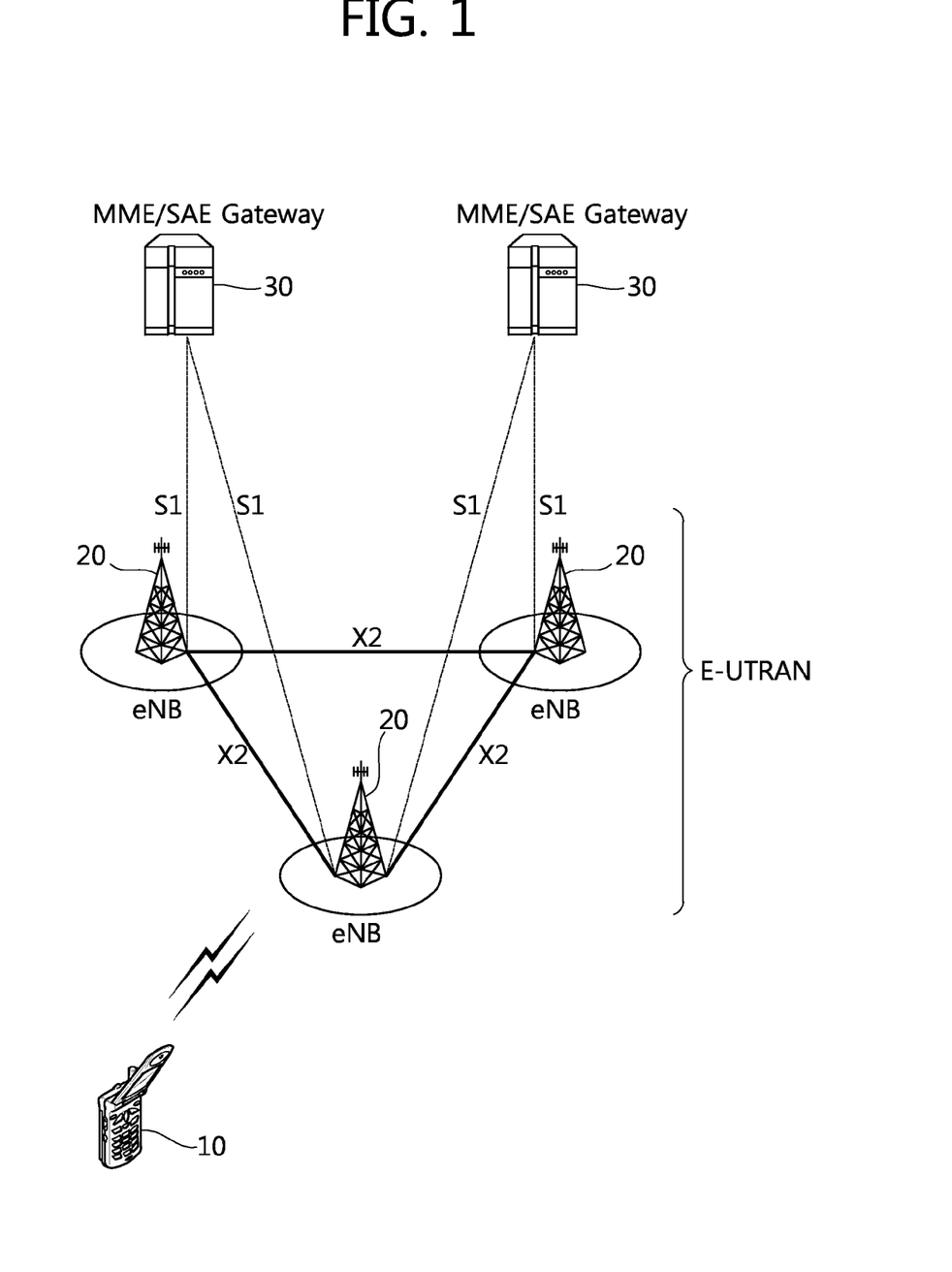
FIG. 1 shows network structure of an evolved universal mobile telecommunication system (E-UMTS).

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
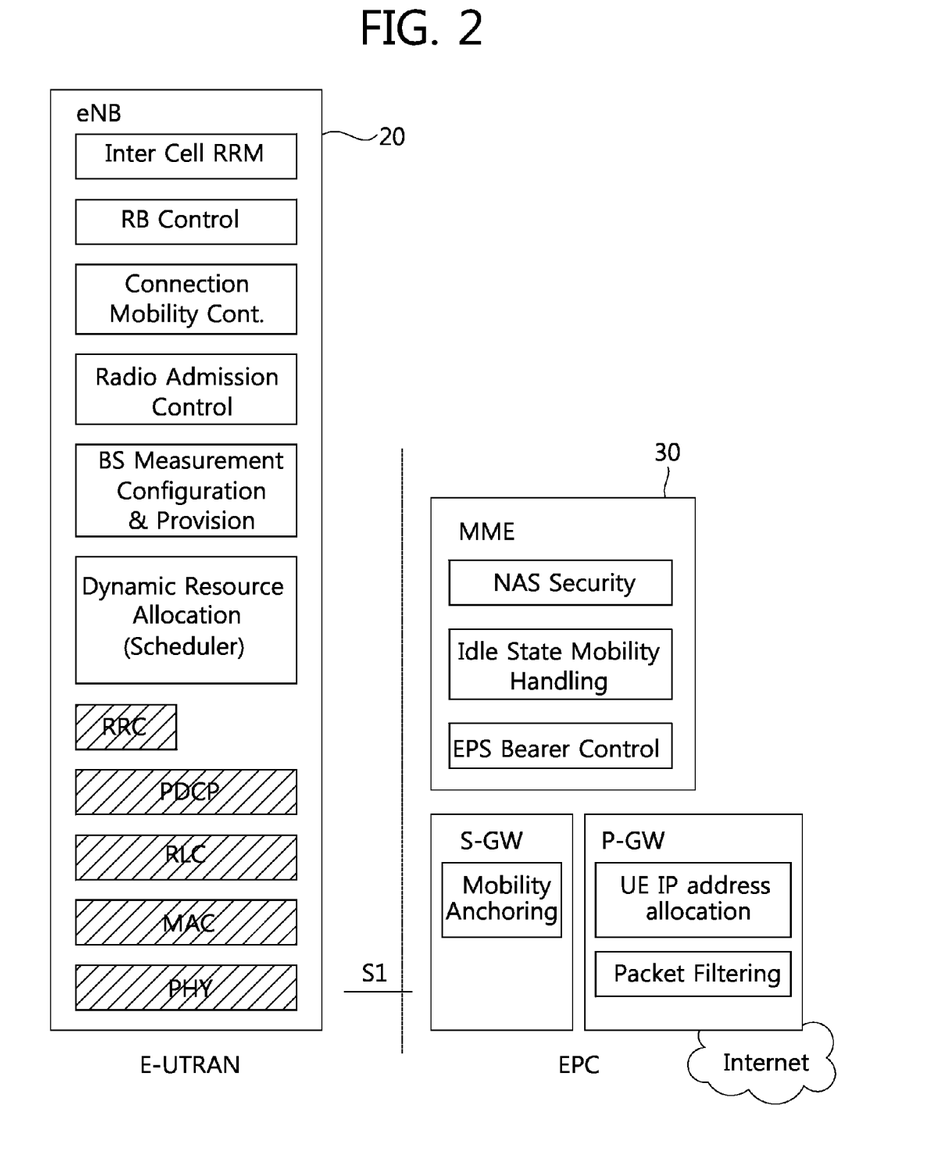
FIG. 2 shows architecture of a typical E-UTRAN and a typical EPC.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
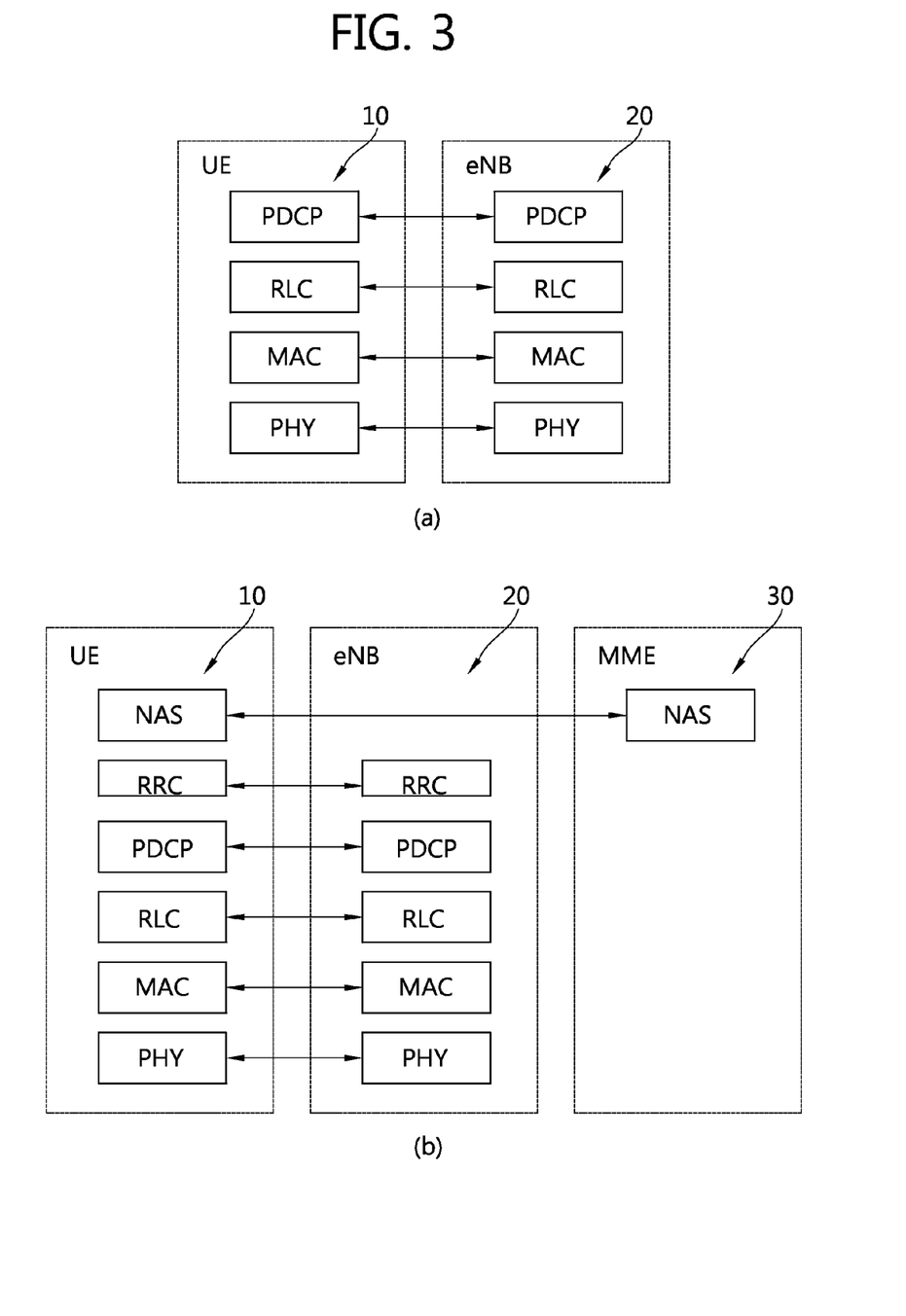
FIG. 3 shows a user-plane protocol and a control-plane protocol stack for the E-UMTS.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking update message to the network to update its location.

Figure 4:
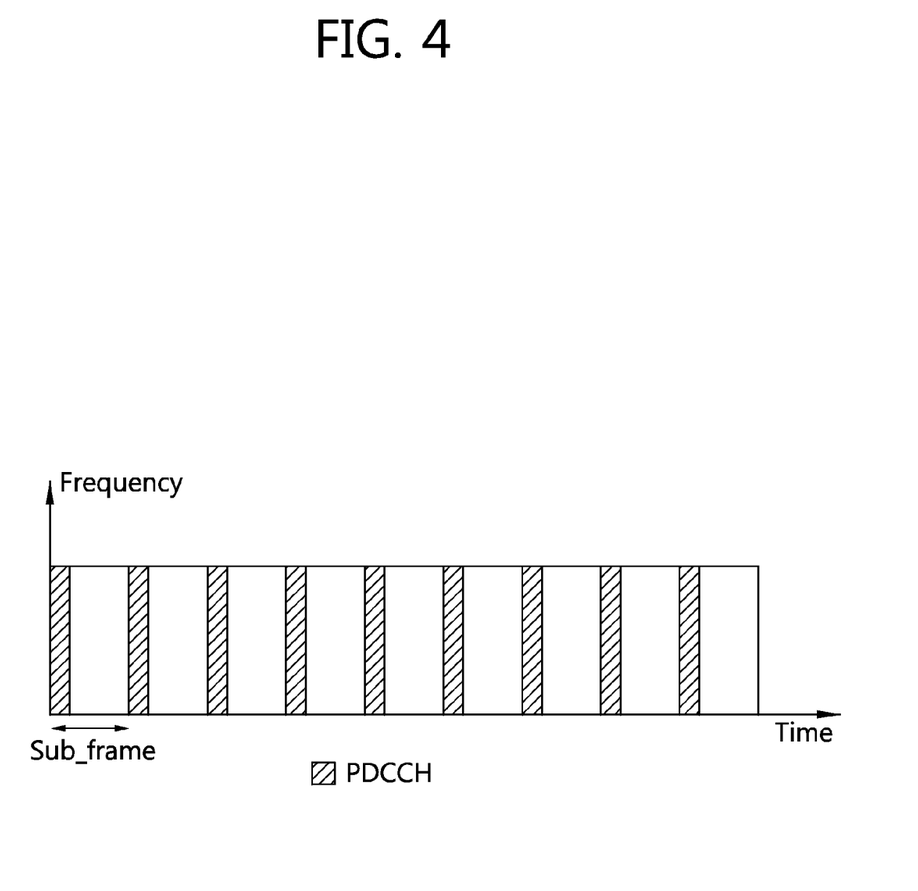
FIG. 4 shows an example of structure of a physical channel.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

For the LTE, self-optimizing networks (SON) concept and many features have been standardized from Rel-8 to Rel-10. The SON aims at maintaining network quality and performance with minimum manual intervention from the operator. Even though an automatic neighbor relation (ANR) function and a minimization of drive tests (MDT), specified in the LTE context, were introduced during Rel-10 in the UTRAN as well, most problems that have SON solutions in the LTE are not addressed in the UTRAN. Introducing SON functions for the UTRAN is also important for operators to minimize operating expenses.

Meanwhile, there are mobility issues that do not lead to connection failures, but cause unnecessary signaling at the network side and battery consumption at the user equipment. One of them is a short stay problem, which means unnecessary short stay when the user equipment moves across a network. The short stay problem may be especially relevant in case of heterogeneous network (HetNet) deployments, where a macro cell overlaps with several low power nodes (e.g., pico cell or femto cell), but are not exclusive for those deployments. The short stay problem may also be relevant in case of macro cell deployments. For the short stay problem, it is required to distinguish unnecessary handover procedure from necessary handover procedure. Then, once the unnecessary handover detected, necessary information about the event shall be collected and passed to the cell where the issue originates from.

Accordingly, a method for avoiding the short stay problem is required.

SUMMARY OF THE INVENTION

The present invention provides a method and apparatus for reporting a short stay of a user equipment in a wireless communication system. The present invention provides a method for avoiding a short stay problem in case of HetNet deployments or macro cell deployments.

In an aspect, a method for transmitting, by a first eNodeB (eNB), a ratio of short stay user equipments (UEs) in a wireless communication system is provided. The method includes performing a first handover completion procedure from a second cell, provided by a second eNB, to a first cell, provided by the first eNB, performing a second handover execution procedure from the first cell to a third cell, provided by a third eNB, determining a ratio of a number of short stay UEs, which stay at the first cell shorter than specific threshold time, to total number of UEs staying at the first cell, and transmitting the ratio of the number of short stay UEs to the total number of UEs to the second eNB.

In another aspect, a method for transmitting, by a first eNodeB (eNB), information in a wireless communication system is provided. The method includes receiving measurement information of at least one second cell from a user equipment (UE) connected to the first eNB, determining whether the UE can be connected to the at least one second cell based on the received measurement information or not, and notifying a second eNB whether the UE can be connected to the at least one second cell or not.

In another aspect, a method for transmitting a ratio of short stay user equipments (UEs) in a wireless communication system is provided. The method includes performing a first handover completion procedure from a first cell, provided by a first eNodeB (eNB), to a second cell, provided by a second eNB, performing a second handover execution procedure from the second cell to a third cell, provided by a third eNB, determining, by the third eNB, a ratio of a number of short stay UEs, which stay at the second cell shorter than specific threshold time, to total number of UEs staying at the second cell based on a history of UEs, and transmitting the ratio of the number of short stay UEs to the total number of UEs to the first eNB.

The short stay problem can be prevented.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

In heterogeneous network (HetNet) deployments, a short stay problem may occur.

Figure 5:
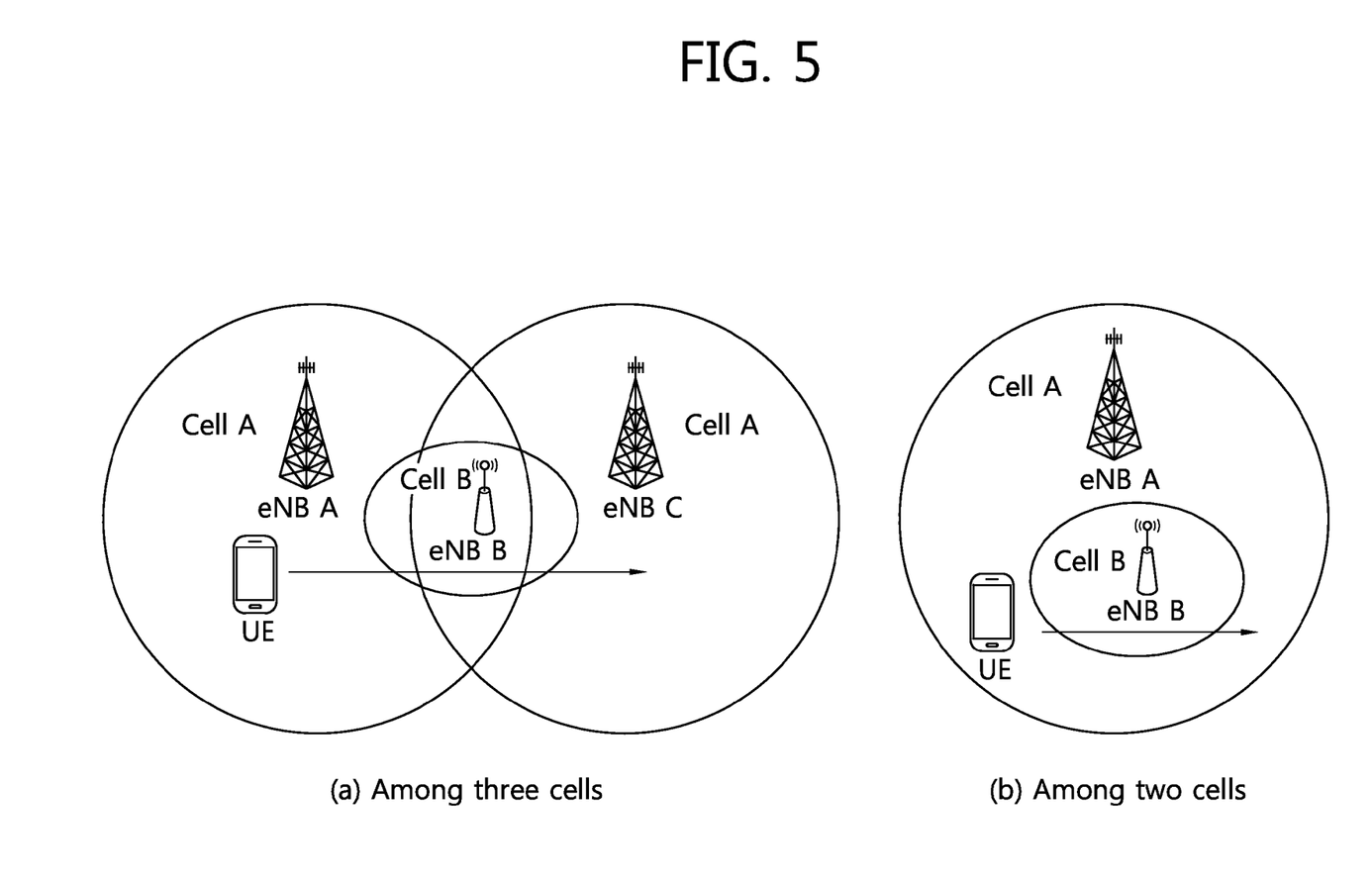
FIG. 5 shows an example of a short stay problem caused by frequent handovers.

FIG. 5 shows an example of a short stay problem caused by frequent handovers.

Referring FIG. 5-(a), cell A and cell C overlap each other, and eNB B locates where cell A and cell C overlap each other. An eNB may include a macro eNB, a pico eNB, and a home eNB (HeNB). Especially, eNB A and eNB C may be a macro eNB, and eNB B may be a pico eNB or a HeNB. Moving UE performs handover procedures from cell A to cell B and from cell B to cell C in rapid succession. That is, handover procedures among three cells in a row may be performed. If the staying time of the UE in cell B is very short, it is better that the UE directly performs handover procedure from cell A to cell C viewed in system efficiency side.

Referring FIG. 5-(b), coverage of cell B is included in coverage of cell A. An eNB may include a macro eNB, a pico eNB, and a HeNB. Especially, eNB A may be a macro eNB, and eNB B may be a pico eNB or a HeNB. Moving UE performs handovers from cell A to cell B and from cell B to cell A again in rapid succession. That is, handover procedures among two cells may be performed. If the staying time of the UE in cell B is very short, it is better that the UE does not perform handover procedure in system efficiency side.

Based on scenarios that short stay problem occurs, the following two cases may be described.

1) A small cell uses a different carrier to macro cells, and is not a compensation cell for coverage holes.

In FIG. 5-(a), if cell B uses a different carrier to cell A and cell C, and cell B is not a coverage hole compensation cell, the UE can maintain the stable connection to cell A or cell B when it is located at the center of cell B. In case that the perfect inter-cell interference coordination (ICIC) is performed among cells, it is possible as well. Hence if the UE shortly stays in cell B, the direct handover from cell A to cell C would be a better choice in order to reduce handover execution overloads.

In FIG. 5-(b), if cell B uses a different carrier to cell A, and cell B is not a coverage hole compensation cell, the UE can maintain the stable connection to cell A or cell B when it is located at the center of cell B. Hence if the UE shortly stays in cell B, the handover procedure may not be performed in order to reduce handover execution overloads.

2) A small cell uses a same carrier to macro cells, or is a compensation cell for a coverage hole.

In FIG. 5-(a), when cell B uses a same carrier to macro cells, or is a coverage hole compensation cell, if the UE goes through the center of cell B without handover to cell B, a radio link failure (RLF) may occur because of the strong interference from cell B or the coverage hole of cell A and cell C. In this case, when discussing about short stay problem, the RLF shall be considered.

In FIG. 5-(b), when cell B uses a same carrier to macro cells, or is a coverage hole compensation cell, if the UE goes through the center of cell B without handover to cell B, an RLF may occur because of the strong interference from cell B or the coverage hole of cell A. In this case, when discussing about short stay problem, the RLF shall be considered.

In order to solve the short stay problem mentioned above, several ideas may be proposed.

(1) The intermediate eNB (eNB B in FIG. 5) on consecutive handover procedures may count a ratio of UEs which stay shorter than a threshold time for specific time duration, and notifies it to the previous eNB (eNB A). The previous eNB reflects this information when it makes a further handover decision.

Figure 6:
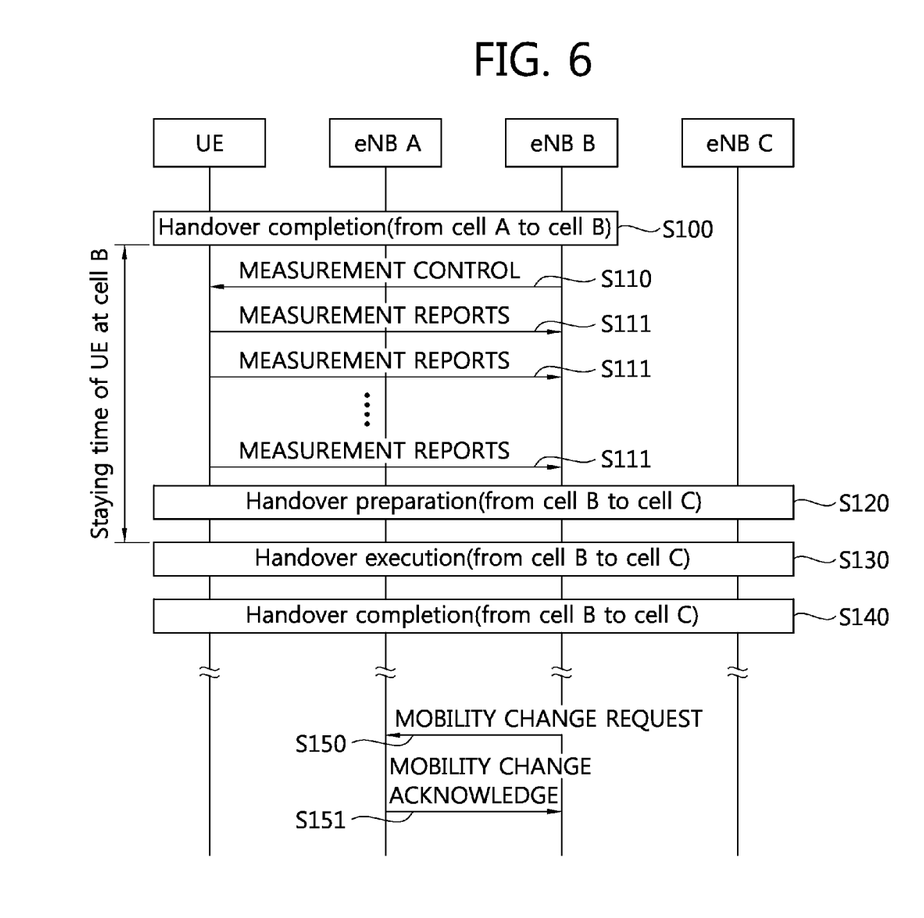
FIG. 6 shows an example of transmitting a ratio of short stay UEs according to an embodiment of the present invention.

FIG. 6 shows an example of transmitting a ratio of short stay UEs according to an embodiment of the present invention.

FIG. 6 shows consecutive handover procedures of the UE from cell A to cell B and from cell B to cell C according to the scenario described in FIG. 5-(a). In addition, it is assumed that an X2 interface between eNB A and eNB B exists.

At step S100, a handover completion procedure from cell A to cell B is performed.

At step S110, eNB B serving the UE transmits a measurement control to the UE. At step S111, the UE transmits measurement reports to eNB B.

As the UE moves fast from cell B to cell C, at step S120, a handover preparation procedure from cell B to cell C is performed. At step S130, a handover execution procedure from cell B to cell C is performed. At step S140, a handover execution procedure from cell B to cell C is performed.

When the UE performs consecutive handover procedure, eNB B measures staying time of the UE at cell B. The staying time is defined as time from the moment of previous handover completion (from cell A to cell B) to the starting moment of next handover execution (from cell B to cell C). Also, eNB B counts the number of 'short stay UEs', which stay shorter than specific threshold time 'UE staying time threshold'. Based on this information, eNB B calculates a ratio of 'short stay UEs' in the total staying UEs at its cell for 'UE number counting duration'. That is, the ratio of 'short stat UEs' for 'UE number counting duration' is calculated according to Equation "(the number of 'short stay UEs')/(the total number of UEs staying at cell)".

At step S150, eNB B transmits the ratio of 'short stay UEs' to eNB A through the X2 interface. The ratio of 'short stay UEs' may be transmitted included in a mobility change request message. At step S151, eNB A transmits a mobility change acknowledge message to eNB B in response to the mobility change request message.

Figure 7:
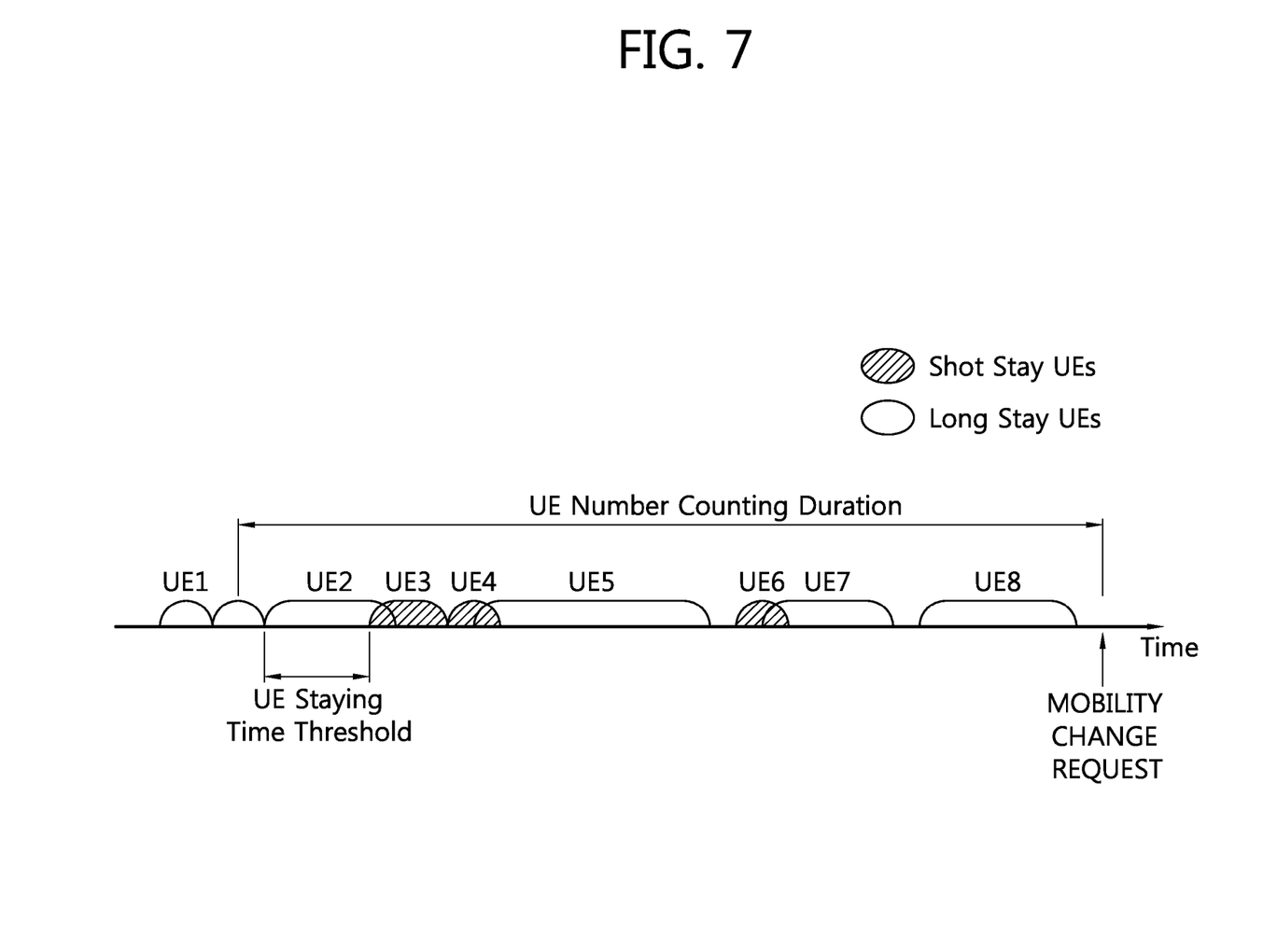
FIG. 7 shows an example of staying time of UEs at a cell according to an embodiment of the present invention.

FIG. 7 shows an example of staying time of UEs at a cell according to an embodiment of the present invention.

Referring to FIG. 7, eNB B measures staying time of the UE at cell B for 'UE number counting duration'. In FIG. 7, UE 2, UE 5, UE 7 and UE 8 stays at cell B longer than 'UE staying time threshold', and UE 3, UE 4 and UE 6 stays at cell B shorter than 'UE staying time threshold'. Accordingly, the ratio of 'short stay UEs' is 3/7.

Figure 8:
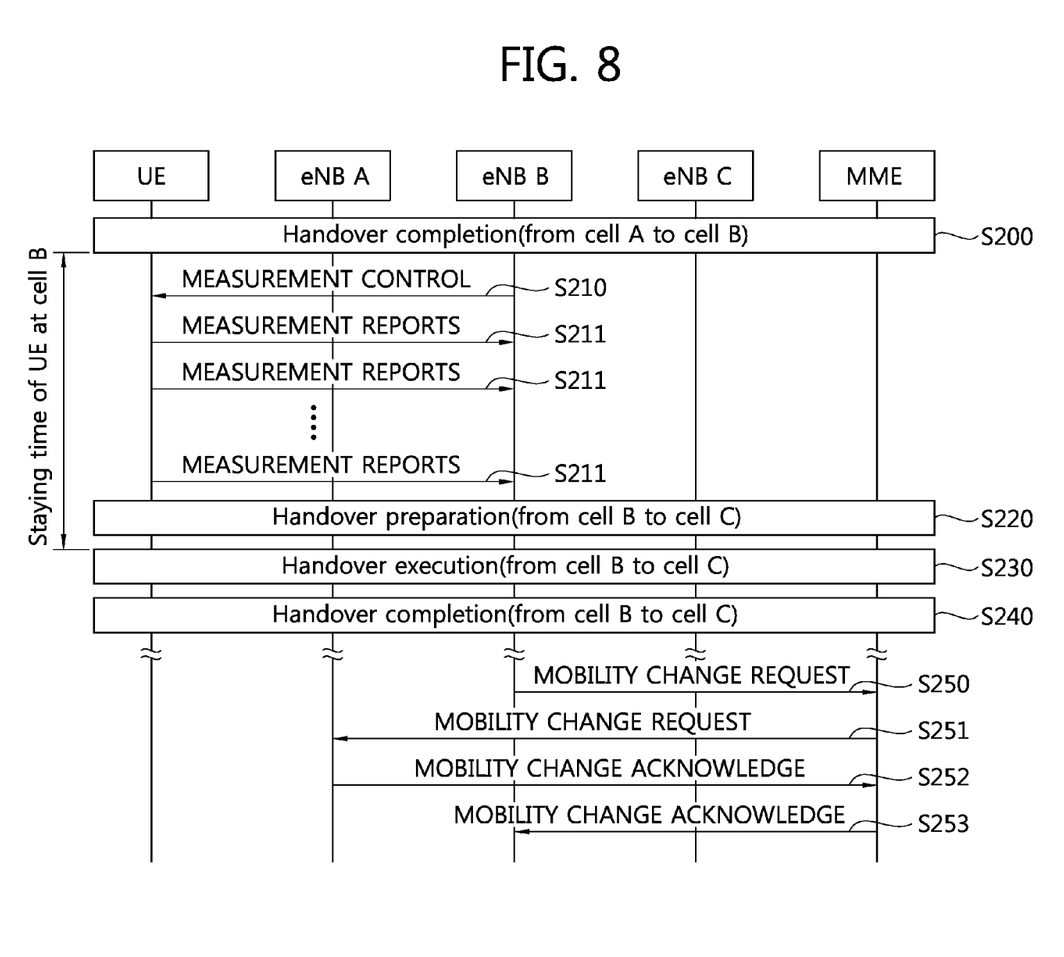
FIG. 8 shows another example of transmitting a ratio of short stay UEs according to an embodiment of the present invention.

FIG. 8 shows another example of transmitting a ratio of short stay UEs according to an embodiment of the present invention.

FIG. 8 shows consecutive handover procedures of the UE from cell A to cell B and from cell B to cell C according to the scenario described in FIG. 5-(a). In addition, it is assumed that an X2 interface between eNB A and eNB B does not exist. Therefore, procedure between eNB A and eNB B may be performed through an S1 interface.

At step S200, a handover completion procedure from cell A to cell B is performed.

At step S210, eNB B serving the UE transmits a measurement control to the UE. At step S211, the UE transmits measurement reports to eNB B.

As the UE moves fast from cell B to cell C, at step S220, a handover preparation procedure from cell B to cell C is performed. At step S230, a handover execution procedure from cell B to cell C is performed. At step S240, a handover execution procedure from cell B to cell C is performed.

When the UE performs consecutive handover procedure, eNB B measures staying time of the UE at cell B. The staying time is defined as time from the moment of previous handover completion (from cell A to cell B) to the starting moment of next handover execution (from cell B to cell C). Also, eNB B counts the number of 'short stay UEs', which stay shorter than specific threshold time 'UE staying time threshold'. Based on this information, eNB B calculates a ratio of 'short stay UEs' in the total staying UEs at its cell for 'UE number counting duration'. That is, the ratio of 'short stat UEs' for 'UE number counting duration' is calculated according to Equation "(the number of 'short stay UEs')/(the total number of UEs staying at cell)".

At step S250, eNB B transmits the ratio of 'short stay UEs' to a mobility management entity (MME) through the S1 interface, and the MME forwards the ratio of 'short stay UEs' to the eNB A through the S1 interface at step S251. The ratio of 'short stay UEs' may be transmitted included in a mobility change request message. At step S252, eNB A transmits a mobility change acknowledge message to the MME in response to the mobility change request message through the S1 interface, and the MME forwards the mobility change request message to the eNB B through the S1 interface at step S253.

Figure 9:
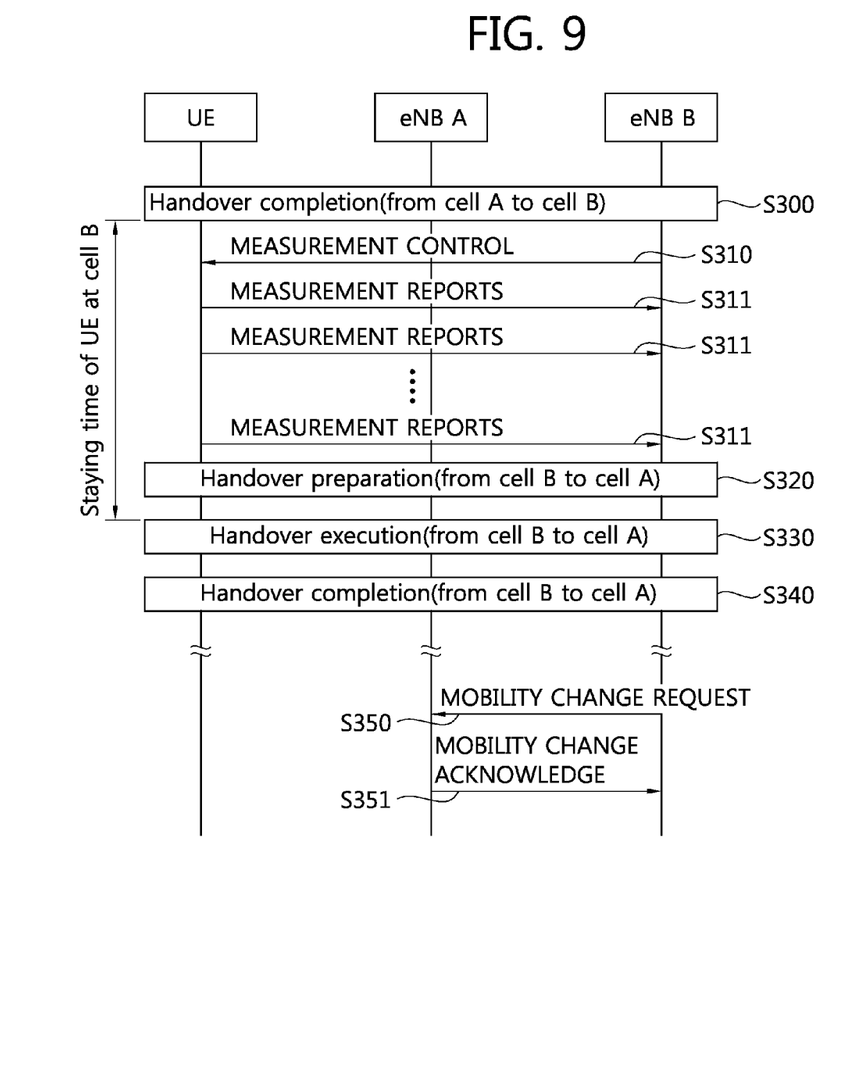
FIG. 9 shows another example of transmitting a ratio of short stay UEs according to an embodiment of the present invention.

FIG. 9 shows another example of transmitting a ratio of short stay UEs according to an embodiment of the present invention.

FIG. 9 shows consecutive handover procedures of the UE from cell A to cell B and from cell B to cell A again according to the scenario described in FIG. 5-(b). In addition, it is assumed that an X2 interface between eNB A and eNB B exists.

At step S300, a handover completion procedure from cell A to cell B is performed.

At step S310, eNB B serving the UE transmits a measurement control to the UE. At step S311, the UE transmits measurement reports to eNB B.

As the UE moves fast from cell B to cell A again, at step S320, a handover preparation procedure from cell B to cell A is performed. At step S330, a handover execution procedure from cell B to cell A is performed. At step S340, a handover execution procedure from cell B to cell A is performed.

When the UE performs consecutive handover procedure, eNB B measures staying time of the UE at cell B. The staying time is defined as time from the moment of previous handover completion (from cell A to cell B) to the starting moment of next handover execution (from cell B to cell A). Also, eNB B counts the number of 'short stay UEs', which stay shorter than specific threshold time 'UE staying time threshold'. Based on this information, eNB B calculates a ratio of 'short stay UEs' in the total staying UEs at its cell for 'UE number counting duration'. That is, the ratio of 'short stat UEs' for 'UE number counting duration' is calculated according to Equation "(the number of 'short stay UEs')/(the total number of UEs staying at cell)".

At step S350, eNB B transmits the ratio of 'short stay UEs' to eNB A through the X2 interface. The ratio of 'short stay UEs' may be transmitted included in a mobility change request message. At step S351, eNB A transmits a mobility change acknowledge message to eNB B in response to the mobility change request message.

Figure 10:
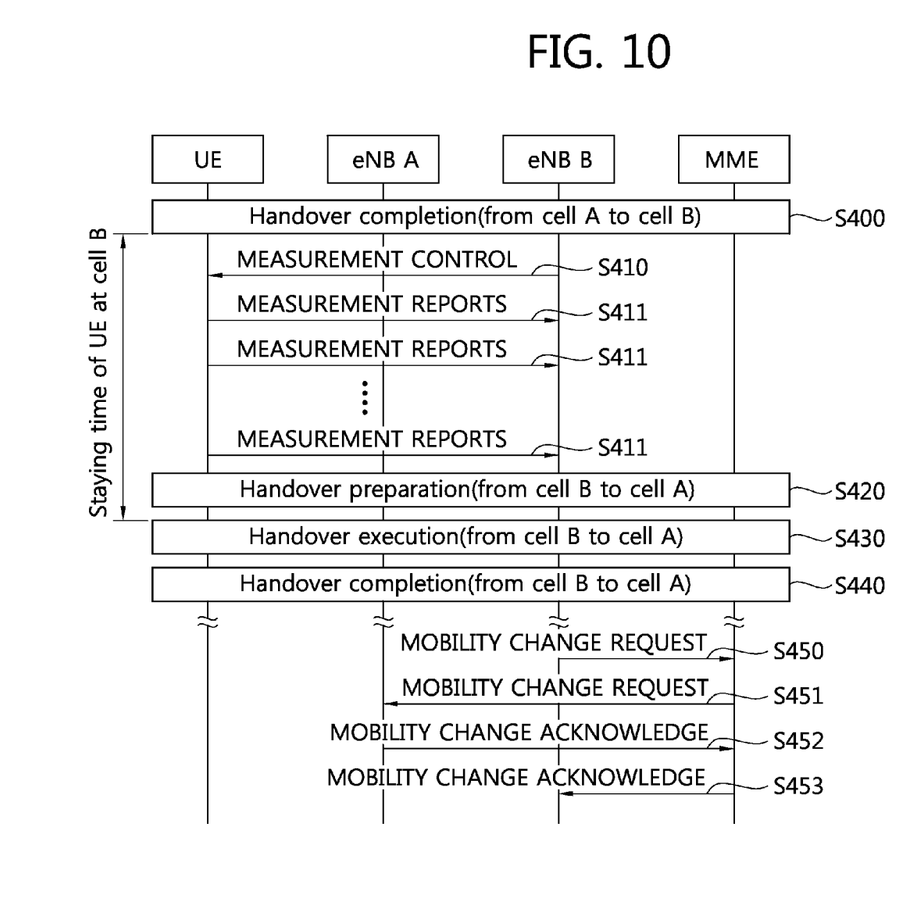
FIG. 10 shows another example of transmitting a ratio of short stay UEs according to an embodiment of the present invention.

FIG. 10 shows another example of transmitting a ratio of short stay UEs according to an embodiment of the present invention.

FIG. 10 shows consecutive handover procedures of the UE from cell A to cell B and from cell B to cell A again according to the scenario described in FIG. 5-(b). In addition, it is assumed that an X2 interface between eNB A and eNB B does not exist. Therefore, procedure between eNB A and eNB B may be performed through an S1 interface.

At step S400, a handover completion procedure from cell A to cell B is performed.

At step S410, eNB B serving the UE transmits a measurement control to the UE. At step S411, the UE transmits measurement reports to eNB B.

As the UE moves fast from cell B to cell A again, at step S420, a handover preparation procedure from cell B to cell A is performed. At step S430, a handover execution procedure from cell B to cell A is performed. At step S440, a handover execution procedure from cell B to cell A is performed.

When the UE performs consecutive handover procedure, eNB B measures staying time of the UE at cell B. The staying time is defined as time from the moment of previous handover completion (from cell A to cell B) to the starting moment of next handover execution (from cell B to cell A). Also, eNB B counts the number of 'short stay UEs', which stay shorter than specific threshold time 'UE staying time threshold'. Based on this information, eNB B calculates a ratio of 'short stay UEs' in the total staying UEs at its cell for 'UE number counting duration'. That is, the ratio of 'short stat UEs' for 'UE number counting duration' is calculated according to Equation "(the number of 'short stay UEs')/(the total number of UEs staying at cell)".

At step S450, eNB B transmits the ratio of 'short stay UEs' to a MME through the S1 interface, and the MME forwards the ratio of 'short stay UEs' to the eNB A through the S1 interface at step S451. The ratio of 'short stay UEs' may be transmitted included in a mobility change request message. At step S452, eNB A transmits a mobility change acknowledge message to the MME in response to the mobility change request message through the S1 interface, and the MME forwards the mobility change request message to the eNB B through the S1 interface at step S453.

(2) If the intermediate eNB detects the UEs which have no substitutive cell to be able to serve them at some moments, it also notifies it to the previous eNB. The previous eNB reflects this information when it makes a further handover decision.

Figure 11:
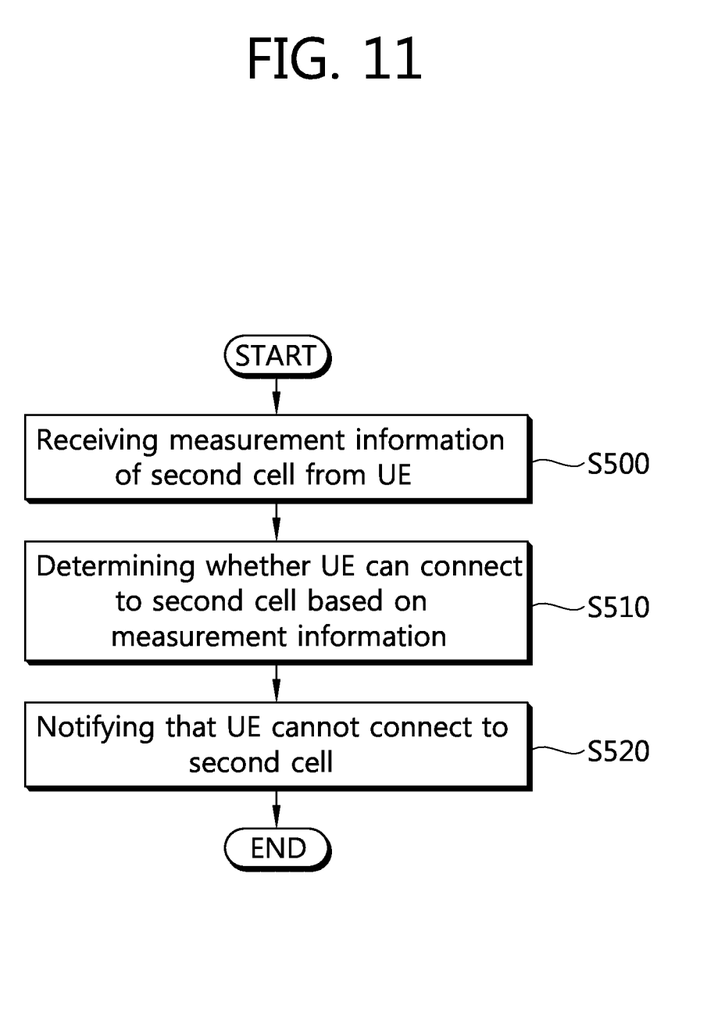
FIG. 11 shows an example of method of transmitting information according to an embodiment of the present invention.

FIG. 11 shows an example of method of transmitting information according to an embodiment of the present invention.

At step S500, a first eNB receives measurement information of second cell from the UE. While the UE is connected to the intermediate cell provided by the first eNB, the UE continuously measures the received signal power from neighbour cells, and reports the measured information to the first eNB which manages the intermediate cell.

At step S510, the first eNB determines whether the UE can be connected to the second cell based on received measurement information. If the first eNB recognizes UEs which do not always have substitutive cells to be able to serve them instead of the intermediate cell, the first eNB notifies whether UE can be connected to second cell or not to the previous eNB at step S520.

For example in FIG. 5-(a), while the UE is connected to cell B, the UE continuously measures the received signal power from cell A and cell C. The UE reports the measured information to eNB B. For every UE staying at cell B, eNB B estimates whether it is possible that each UE is stably connected to cell A or cell C instead of cell B at every moment or not. If eNB B detects the UE which cannot momentarily be connected to cell A or cell C in order to substitute cell B, eNB B notifies this event to eNB A. eNB B notifies that if UE does not perform handover to cell B in the coverage area of cell B, then the RLF may occur. It means that cell B uses same carrier to cell A or cell C, or it is a compensation cell for a coverage hole. After transmitting the information about this event, eNB B can stop measuring and reporting the ratio of 'short stay UEs'.

The mechanism described above may be implemented by measurement report triggering 'Event A4' in 3GPP TS 36.331 V10.3.0 (2011-09). 'Event A4' means that neighbor becomes better than threshold. While the UE is connected to cell B, if there is a moment in which 'Event A4' does not occur, then eNB B may inform it to eNB A.

(3) The last eNB may count the number of UEs which stay shorter than a threshold time at the intermediate cell. For example in FIG. 5-(a), eNB C may count the number of UEs which stay shorter than a threshold time at the cell B instead of eNB B. Accordingly, eNB C calculates a ratio of 'short stay UEs' in the total staying UEs for 'UE number counting duration', and eNB C transmits the ratio of 'short stay UEs' to a previous eNB (eNB A). eNB C may determine the ratio of 'short stay UEs' base on a history of the UE.

(4) For the method described above in (2), the first eNB may request the intermediate eNB to perform the measurement of UEs.

Figure 12:
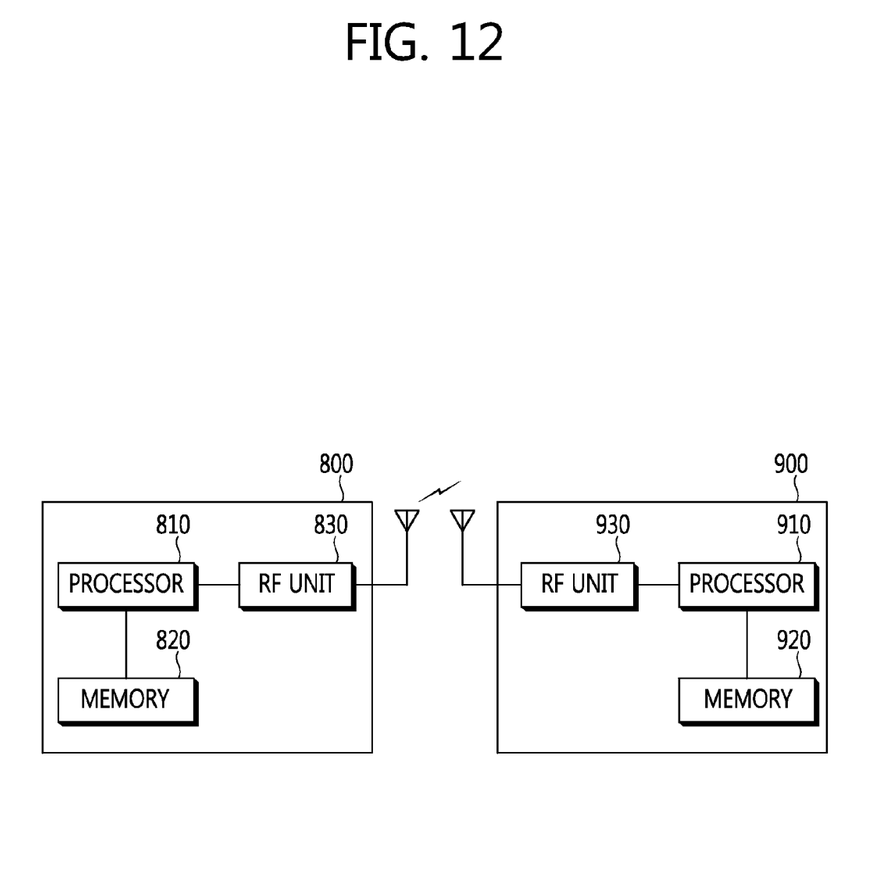
FIG. 12 is a block diagram showing wireless communication system to implement an embodiment of the present invention.

FIG. 12 is a block diagram showing wireless communication system to implement an embodiment of the present invention.

A first eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a first eNodeB (eNB), a ratio of short stay user equipments (UEs) in a wireless communication system, the method comprising:

performing a first handover completion procedure from a second cell, provided by a second eNB, to a first cell, provided by the first eNB;

performing a second handover execution procedure from the first cell to a third cell, provided by a third eNB;

determining a ratio of a number of short stay UEs, which stay at the first cell shorter than specific threshold time, to total number of UEs staying at the first cell; and transmitting, by the first eNB, the ratio of the number of short stay UEs to the total number of UEs to the second eNB, which uses the ratio to control the number of handovers involving the first cell.

2. The method of claim 1, wherein determining the ratio of the number of short stay UEs to the total number of UEs comprises:

measuring staying time of each UE at the first cell;

counting the number of short stay UEs which stay at the first cell shorter than the specific threshold time; and calculating the ratio of the number of short stay UEs to the total number of UEs.

3. The method of claim 2, wherein the staying time of each UE is defined as time from a moment when the first handover completion procedure is performed to a starting moment when the second handover execution procedure is performed.

4. The method of claim 1, wherein the second eNB and the third eNB are the same eNBs.

5. The method of claim 1, wherein the second eNB and the third eNB are different eNBs.

6. The method of claim 1, wherein the ratio of the number of short stay UEs to the total number of UEs is transmitted to the second eNB directly through an X2 interface.

7. The method of claim 1, wherein the ratio of the number of short stay UEs to the total number of UEs is transmitted to the second eNB indirectly across a mobility management entity (MME) through an S1 interface.

8. The method of claim 1, wherein the ratio of the number of short stay UEs to the total number of UEs is transmitted in a mobility change request message.

9. The method of claim 8, further comprising receiving a mobility change acknowledgement message from the second eNB in response to the mobility change request message.

10. The method of claim 1, wherein the first eNB is one of a macro eNB, a pico eNB and a home eNB (HeNB).

11. A method for transmitting a ratio of short stay user equipments (UEs) in a wireless communication system, the method comprising:

performing a first handover completion procedure from a first cell, provided by a first eNodeB (eNB), to a second cell, provided by a second eNB;

performing a second handover execution procedure from the second cell to a third cell, provided by a third eNB;

determining, by the third eNB, a ratio of a number of short stay UEs, which stay at the second cell shorter than specific threshold time, to total number of UEs staying at the second cell based on a history of UEs; and transmitting, by the third eNB, the ratio of the number of short stay UEs to the total number of UEs to the first eNB, which uses the ratio to control the number of handovers involving the second cell.

\* \* \* \* \*